Dec. 2, 1947.   R. B. GRANT   2,431,749

POTENTIOMETER HOUSING AND POSITIONING STRUCTURE

Filed Nov. 15, 1945   2 Sheets-Sheet 1

INVENTOR
ROBERT B. GRANT
BY Bromley Seeley
ATTORNEY

Dec. 2, 1947.  R. B. GRANT  2,431,749
POTENTIOMETER HOUSING AND POSITIONING STRUCTURE
Filed Nov. 15, 1945  2 Sheets-Sheet 2
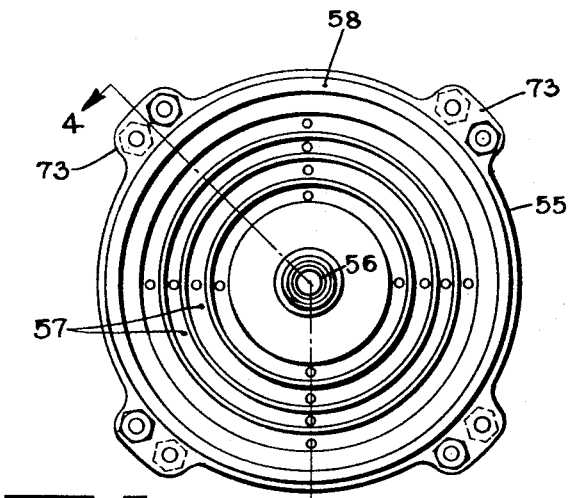
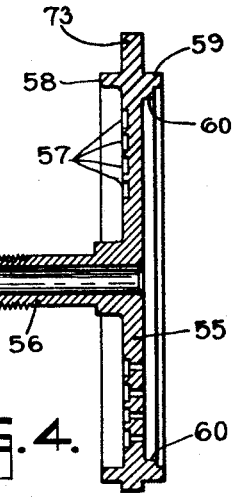
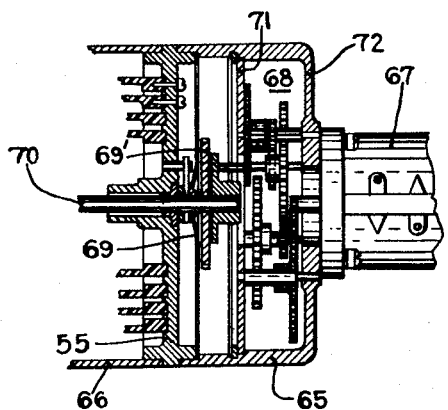
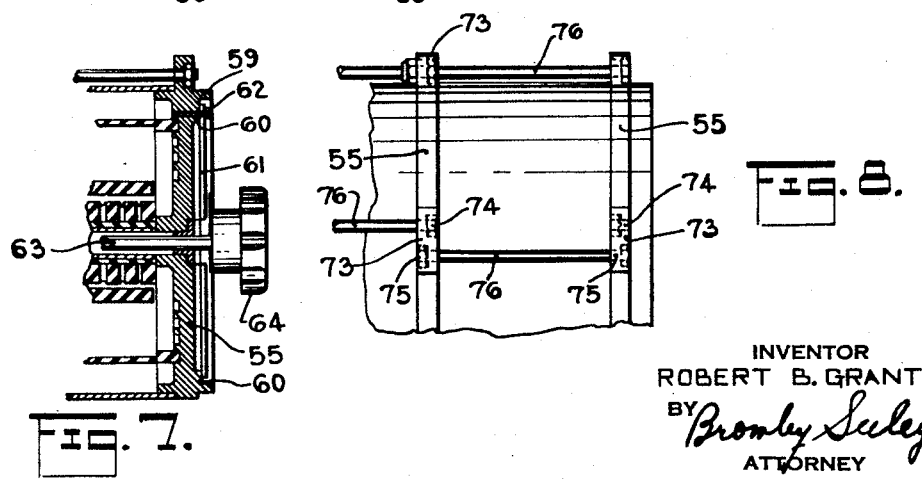
INVENTOR
ROBERT B. GRANT
BY Bromley Seeley
ATTORNEY Patented Dec. 2, 1947

2,431,749

UNITED STATES PATENT OFFICE 2,431,749

POTENTIOMETER HOUSING AND POSITIONING STRUCTURE

Robert B. Grant, Mendham, N. J., assignor to Curtiss-Wright Corporation, Bloomfield, N. J., a corporation of Delaware Application November 15, 1945, Serial No. 628,845

11 Claims. (Cl. 201—48)

This invention relates to electrical apparatus and more particularly to housing and positioning structure for electrical apparatus involving a plurality of generally similar units, such as, for example, servo-operated potentiometer units of the type used in aircraft trainers.

An object of this invention is to provide improved, standardized structure that is simple, inexpensive and compact for joining together in a single housing assembly a plurality of electrical units adapted for operation in common.

A further object of this invention is to provide improved standardized end-plate or partition structure for both joining together a plurality of casing units and for positioning and supporting electrical apparatus housed therein.

The invention will be more fully set forth in the following description referring to the accompanying drawings, and the features of novelty will be pointed out with particularity in the claims annexed to and forming a part of this specification.

Referring to the drawings:

Figs. 4 and 5 are sectional and plan views respectively of an end plate member;

Fig. 6 is a fragmentary sectional view of a potentiometer embodying the invention;

Fig. 7 is a similar view of an integrator unit also embodying the invention, and Fig. 8 is a fragmentary view of the housing exterior illustrating means for securing together the elements of each housing unit.

In accordance with this invention in a specific embodiment thereof a plurality of potentiometers are mounted in casing units having standardized interchangeable plates or partitions which interconnect and are common to adjoining units and which also serve to position and support potentiometer elements and associated electric equipment within the respective casing units so as to form a single compact assembly, the assembly also including a servo-motor which may be controlled in accordance with a simulated flight condition for operating said potentiometers, as described in Dehmel Patent No. 2,366,603, granted January 2, 1945, for "Aircraft training apparatus."

Figure 1:
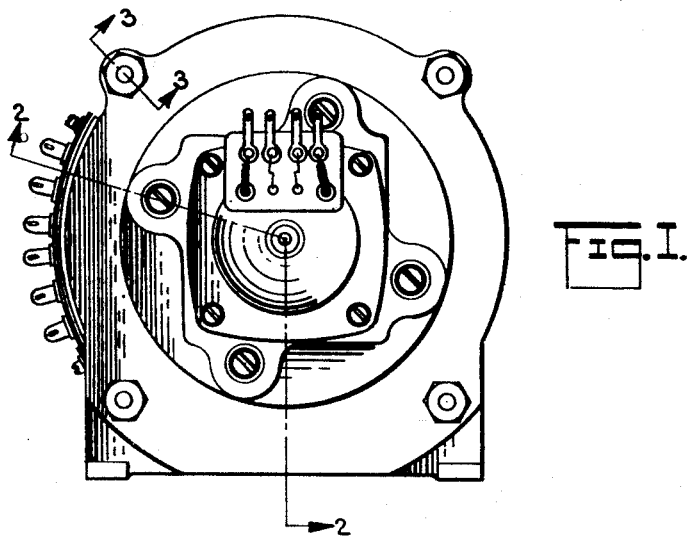
Fig. 1 is an end view of a combined servo and potentiometer assembly embodying this invention.
Figure 2:
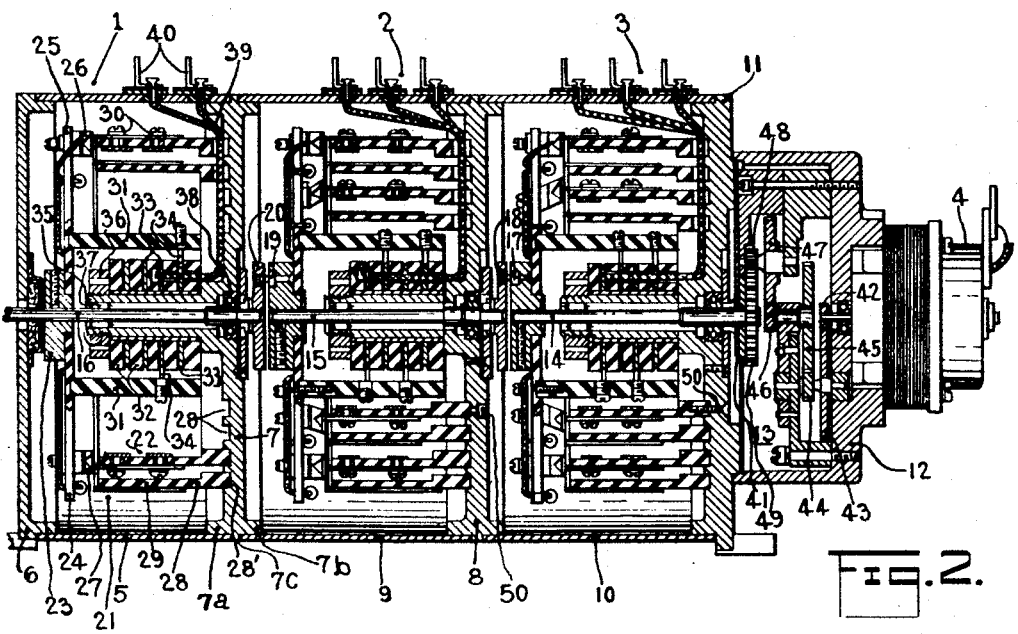
Fig. 2 is a sectional view taken along the line 2—2 of Fig. 1.

Referring more particularly to Figs. 1 and 2, a plurality of potentiometer units 1, 2, and 3 are united in a common assembly for operation by a servo-motor 4, each potentiometer unit comprising a housing or casing formed, for example, by a cylindrical shell and end-plates. Specifically, the housing structure of unit 1 comprises a cylindrical shell 5, and cover plate 6, which also constitutes an end plate of the assembly, and an opposite end-plate 7 which is common to and forms a partition between the units 1 and 2. In like manner, the end-plate 8 is common to, and forms a partition between the units 2 and 3. The casing shells 5 and 9 of the units 1 and 2 are interconnected by the end-plate 7 and the shells 9 and 10 of units 2 and 3 are interconnected by the end-plate 8. The end-plate 11 forms the opposite wall of the assembly and supports the servo-unit including the reduction gear housing 12 and servo-motor 4.

Each of the end-plates 7 and 8 is similar in construction and is formed as a preferably flat disc-like member having rib-like flanges or the like at the opposite sides of the disc member and adjacent to the outer periphery thereof. For example, the end plate 7 is provided with an annular flange 7a at the side adjacent to the section 1 and a similar flange 7b at the opposite side, both flanges being spaced a short distance from the outer peripherial portion 7c so that the housing sections 5 and 9 slide over the respective flanges in telescopic relation and abut the peripherial portion 7c. With this construction, the housing sections and end-plates present a flush surface at the exterior of the housing.

The potentiometers of each unit are operated in unison by the servo-motor through the reduction gearing generally indicated at 13 and the interconnected shafts 14, 15, and 16. The shaft 14, to which the drive gear 49 is connected, is coupled to the shaft 15 by means of a simple pin and fork connection 17—18, the pin and fork elements being secured to the shafts 14 and 15 respectively, as indicated. In like manner the shafts 15 and 16 are coupled by the pin and fork connection 19—20.

Each potentiometer comprises a fixed cylindrical element secured in position to an end-plate of the corresponding unit for cooperation with a movable contact connected to the operating shaft above-referred to. Referring specifically to the unit 1 wherein two potentiometers 21 and 22 are shown in concentric nested relation, the operating shaft 16 has secured thereto a sleeve 23, to which is connected an insulating member forming a pair of oppositely extending arms 24 and 25, which carry the potentiometer contacts 26 and 27 respectively. These contacts operate in sliding engagement along the conductive end turns of the potentiometers in a manner well known in the art. A stationary potentiometer element such as 21 for example, comprises a cylindrical insulating ring 28 mounted in an annular groove 28' in the end-plate 7 and a suitably contoured resistance element 29 that is secured at 30 to the insulating ring. The respective potentiometer contact engages the protruding edge of the resistance element as illustrated so that rotation of the shaft 16 causes the contacts 26 and 27 to assume different angular positions with respect to the potentiometers 21 and 22 respectively.

The slip ring arrangement for connecting the movable potentiometer contacts to exterior circuits comprises a pair of brush supporting insulating members 31 carried by the contact arms 24 and 25 and a plurality of relatively fixed insulating discs 32 for positioning the contact slip rings 33, with respect to the movable brush contacts 34. The slip ring assembly is mounted on the hub 35 which extends axially from the end plate 7 and is secured thereto by the clamping nut 36. The hub 35 also serves as a journal box for the potentiometer operating shaft 16 which is rotatably mounted in roller bearings 37 and 38. The slip rings 33 are connected by corresponding conductors 39 to terminals 40 mounted on the exterior of the housing.

As previously pointed out, the potentiometers, which are generally similar in construction in the units 1, 2, and 3, have a common operating means comprising the coupled shafts 16, 15, and 14 which are operated through a friction clutch 41 and the gear train 13 by the servo-motor 4. The gear train has a high reduction ratio and includes the driving pinion 42, gear 43, pinion 44, gear 45, pinion 46, gear 47, pinion 48, and gear 49, which is connected to the friction clutch 41. The friction clutch permits manual adjustment of the potentiometers by a knob (not shown) connected to shaft 16, independently of the gear train.

It will be noted that the end-plates of each section have provision for as many as four potentiometers, the fixed cylindrical element of each potentiometer being positioned and mounted in one of the concentric grooves 28'. The insulating potentiometer rings are secured to the respective end-plates by means of threaded bolts 50 extending through the end-plate in spaced relation along said concentric grooves. A compact and easily assembled construction is thereby provided.

It will, therefore, be seen that the housing section end-plates serve both as positioning and mounting structure for the potentiometers and associated electrical equipment within the respective housing and also as standardized end-plate and partition structure for providing, if desired, means for coupling an additional unit to the assembly. This is an important advantage where quantity production is required, both from the standpoint of saving in time by the use of standardized end-plates, and also from the standpoint of cost, since fewer specially designed parts are required.

Figure 3:
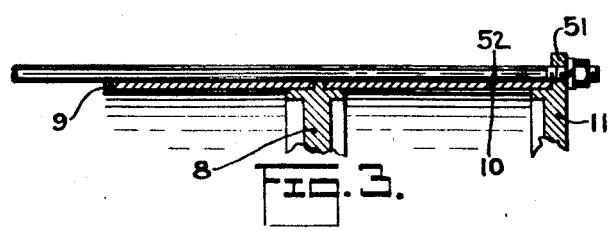
Fig. 3 illustrates a detail of the aforesaid assembly taken along the line 3—3 of Fig. 1.

Figure 3 illustrates a manner in which the housing sections may be clamped together. The end-plate 11 is provided with a lug 51 to which a through bolt 52 connected to the end-plate (not shown) at the opposite end of the housing is suitably secured.

The housing structure above described may be further modified so as to provide even greater flexibility and standardization in the assembly of electrical apparatus. Figs. 4 to 7 inclusive illustrate modifications of the invention which are particularly useful for certain types of potentiometers and integrators. In this case, the end-plate, Figs. 4 and 5, can also be used in place of the plate 11, Fig. 2, and is essentially the same as the members 7 and 8 previously described, in that it comprises a disc-like member 55 having an axially extending hub portion 56, potentiometer positioning concentric grooves 57 and oppositely disposed annular flanges 58 and 59 adjacent to and spaced from the outer periphery of the disc. For the purpose of adapting the end plate for use at the housing exterior, a plurality of circumferentially spaced bosses 60 are formed integral with the flange 59 as more clearly illustrated by Fig. 7. In this arrangement, a dial disc 61 is secured by screws 62, to the bosses 60 so as to form an instrument dial at one end of the housing. The potentiometer operating shaft 63 is shown connected to a manually controlled knob 64 for positioning the potentiometer contacts, the construction in other respects being similar to that previously described.

In Fig. 6 an integrating unit is shown wherein the end-plate 55 serves as a common partition between the gear train housing 65 and potentiometer housing 66, the two housings engaging the end-plate in the manner illustrated by Fig. 2. In this arrangement the motor 67 is mounted on the outer wall of the gear train housing 65 and drives through the gear train 68 and friction clutch 69 the potentiometer operating shaft 70. The gear train 68 which is disposed about a circle so that but part of the gearing is shown, is compactly mounted between parallel supporting walls 71 and 72 in such a manner that a wide range in the reduction ration is possible. The final stage of the gear train (not shown) is connected to a pinion at the opposite side of the wall 71 for driving the gear 69' which is loosely mounted on the shaft 70 between elements of the friction clutch 69 which are secured to the shaft 70.

The above-described arrangement for coupling the gear housing 65 directly to the end-plate 55 in flush relation to the housing 66 provides for greater space and, therefore, greater flexibility in the gear train design as compared with Fig. 2 so that a wide range of reduction ratios is possible.

Fig. 8 illustrates a more flexible arrangement for securing together the elements of the individual housing units as contrasted with Fig. 2 wherein the assembly of all units depends on the through bolts 52. In Fig. 8 the bolt securing lugs 73, which are integral with and peripherally spaced on the end-plate 55, Figs. 4 and 5, are each provided with two bolt holes 74 and 75 so that a plurality of bolts, 76, one for each section, may be used to secure together the elements of that section, including the two end-plates 55 and the cylindrical housing. The lugs of all end-plates are aligned and the bolts are positioned in staggered relation as shown so that a single housing unit can be disassembled without disassembling all other units.

It should be understood that this invention is not limited to specific details of construction, and arrangement thereof herein illustrated, and that changes and modifications may occur to one skilled in the art without departing from the spirit of the invention.

I claim:

1. The combination with electrical apparatus having a housing, of an end-plate for said housing comprising a plate-like member having a centrally-positioned hub extending from one side of said member within said housing, said hub serving as a support for electrical apparatus within said housing and as a journal box for an operating shaft extending through said member, said member having rib-like flange structure on each side thereof adjacent to the periphery of said member so as to form a seat at either side thereof for a cylindrical housing, said housing being adapted to abut said member and to engage the respective flange in telescopic relation thereto and means for securing said housing to said end-plate.

2. The combination with electrical apparatus having a cylindrical housing, of an end-plate for said housing comprising a disc-like member having a centrally positioned hub extending from one side thereof within said housing, said hub serving as a support for electrical apparatus within said housing and as a journal box for an operating shaft extending through said member, said member having a substantially annular rib-like flange on each side thereof spaced from but adjacent to the periphery of said member so as to form a seat at either side thereof for a cylindrical housing, said housing being adapted to abut said member and to fit over the respective flange in telescopic relation thereto so that the peripheral edge of said member is substantially flush with said housing and means for securing said housing to said end plate.

3. The combination with electrical apparatus including potentiometer structure having a cylindrical housing, of an end-plate for said housing comprising a disc-like member having a centrally-positioned hub extending from one side thereof within said housing, said hub serving as a support for electrical apparatus within said housing and as a journal box for a potentiometer operating shaft extending through said member, said member having a plurality of annular grooves in one side thereof for positioning potentiometer elements and also a substantially annular rib-like flange on each side thereof spaced from but adjacent to the periphery of said member so as to form a seat at either side thereof for a cylindrical housing, said housing being adapted to abut said member and to fit over the respective flange in telescopic relation thereto so that the peripheral edge of said member is substantially flush with said housing, said member also having boss portions integral with the flange at the opposite side of the member with respect to said hub for providing alternative mounting for a dial disc and means for securing said housing to said end-plate.

4. The combination with electrical apparatus having a plurality of cylindrical housing sections, of means for defining and uniting adjoining sections comprising an end-plate arranged to be common to and to form a partition between said adjoining sections, said end-plate having rib-like flange structure at each side thereof spaced from but adjacent to the outer periphery of said end-plate so as to form at each side of said plate a seat for receiving a cylindrical housing section in telescopic relation to said flange and in abutting relation to said plate, said plate also having positioning and supporting structure at one side thereof for electrical apparatus within one of said housing sections.

5. The combination with electrical apparatus having a plurality of cylindrical housing sections, of means for defining and uniting adjoining sections comprising a disc-like end-plate arranged to be common to and to form a partition between said adjoining sections, said end-plate having a substantially annular flange at each side thereof, spaced from but adjacent to the outer periphery of said end-plate so as to form at each side of said plate a seat for receiving a cylindrical housing section in telescopic relation to said flange and in abutting relation to said plate, said plate also having an offset hub on one side thereof for supporting electrical apparatus within one of said housing sections.

6. The combination with electrical potentiometer apparatus having a plurality of cylindrical housing sections, of means for defining and uniting adjoining sections comprising an end-plate arranged to be common to and to form a partition between said adjoining sections, said end-plate having flange structure at each side thereof adjacent to the outer periphery of said end-plate so as to form at each side of said plate a seat for receiving in telescopic relation to said flange and in abutting relation to said plate a housing section, said plate also having a hub for supporting potentiometer slip-ring structure, and a plurality of concentric grooves for positioning and supporting potentiometer elements within one of said housing sections.

7. The combination with electrical apparatus including a motor operated gear reduction train and potentiometer structure connected thereto, of housing and mounting structure therefor comprising a cylindrical housing for said potentiometer structure, a disc-like member forming an end wall of said housing, and a cylindrical housing including spaced parallel walls for enclosing said gear reduction train and for supporting an operating motor, said disc-like member having flanges at opposite sides thereof adjacent to the periphery of said member for positioning said potentiometer and gear train housings on said member, said housings being arranged to slide over said flanges respectively and to abut said member so that said housings form a unit assembly of substantially uniform diameter.

8. The combination with electrical apparatus, including a motor-operated gear reduction train and potentiometer structure connected through a friction clutch thereto, of housing and mounting structure therefor comprising a cylindrical housing for said potentiometer structure, a disc-like member forming an end wall of said housing, and a cylindrical housing including spaced parallel walls for enclosing and supporting said gear reduction train, said disc-like member and the inner of said walls being spaced to form an enclosure for said friction clutch, the operating motor being mounted on the outer of said walls, said disc-like member having flanges at opposite sides thereof adjacent to the periphery of said member for positioning said housings on said member, said housings being arranged for telescopic engagement with said flanges respectively and to abut said member so that said housings form a unit assembly of substantially uniform diameter wherein said housings and motor are aligned along a common longitudinal axis.

9. The combination with electrical apparatus having a substantially cylindrical housing, of an end-wall portion for said housing comprising a substantially flat plate-like member having a centrally positioned hub extending from one side thereof within said housing, said hub serving as a journal box for an operating shaft extending through said member, said plate member having a substantially annular rib-like flange laterally extending from each side thereof adjacent to the outer periphery of said plate member so as to form a seat at either side thereof for a cylindrical housing, said housing being adapted to abut said plate member and to fit over the respective flange in telescopic relation thereto so that the peripheral edge of said plate member is substantially flush with said housing.

10. The combination with electrical apparatus having a plurality of substantially cylindrical housing sections, of means for defining and uniting adjoining sections comprising an end-plate arranged to be common to and to form a partition between said adjoining sections, said end-plate having circumferentially arranged rib-like structure extending laterally from each side of and adjacent to the outer periphery of said end-plate so as to form at each side of said plate a seat for receiving a cylindrical housing section in telescopic relation thereto and in abutting relation to said plate, said plate also having positioning and supporting structure at one side thereof for electrical apparatus within one of said housing sections.

11. The combination with electrical apparatus having a plurality of substantially cylindrical housing sections, of means for defining and uniting adjoining sections comprising a disc-like end-plate arranged to be common to and to form a partition between said adjoining sections, said end-plate having a substantially annular flange at each side and near the outer periphery thereof so as to form at each side of said plate an annular seat for receiving a cylindrical housing section in telescopic relation to said flange and in abutting and flush relation to said plate, said plate also having a plurality of concentric grooves on one side thereof for positioning electrical resistance elements within one of said housing sections.

ROBERT B. GRANT.

REFERENCES CITED

The following references are of record in the file of this patent:

UNITED STATES PATENTS

| Number | Name | Date |
| --- | --- | --- |
| 1,449,725 | Beckert | Mar. 27, 1923 |
| 1,596,163 | Eaves | Aug. 17, 1926 |
| 2,120,651 | Schellenger | June 14, 1938 |
| 2,303,499 | Rich | Dec. 1, 1942 |